Aug. 2, 1932.    L. R. HAND ET AL    1,870,112
BOLT AND CLAMP
Filed April 6, 1931
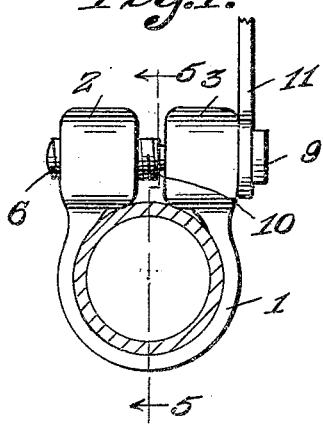
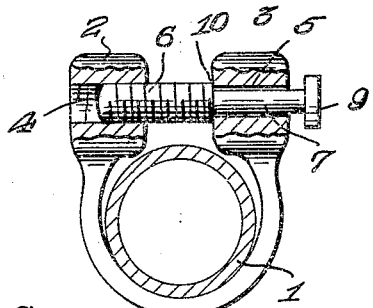
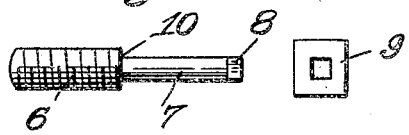
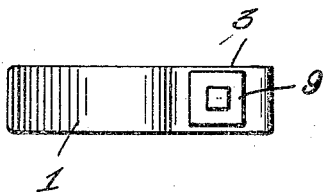
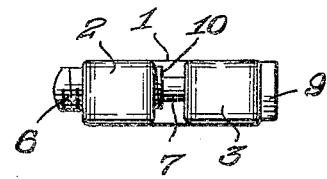
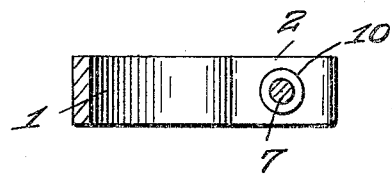
Leon R. Hand,
Lewis A. Hyster,
INVENTOR
BY Victor J. Evans and Co.
ATTORNEY Patented Aug. 2, 1932

1,870,112

UNITED STATES PATENT OFFICE

LEON R. HAND, OF HUMMELS WHARF, AND LEWIS A. EYSTER, OF SUNBURY, PENNSYLVANIA

BOLT AND CLAMP

Application filed April 6, 1931. Serial No. 528,170.

Our present invention has reference to a clamp, such as a pipe clamp, a clamp for battery terminals, a clamp for cables, hinge clamps and the like, and our object is the provision of means for expanding such clamps to permit of the same being positioned upon the article or object to be engaged thereby, removed therefrom or for compressing the same for tightly engaging such object.

A further object is the provision of a split ring clamp which is of metal, yieldable under pressure and which has its ends offset and provided with alining openings, the bore of one being larger than the other and being threaded for engagement with the threaded portion of a bolt, the said bolt having a reduced portion that passes through the smaller opening in the second end of the clamp and which reduced portion has fixed on its outer end a head to be engaged by a wrench, and whereby the bolt, when screwed in one direction, will have the head thereof contact with one of the ends of the arms of the clamp for forcing the same toward the second end or arm for compressing the body of the clamp and whereby when the bolt is turned in a second direction, the shoulder between the reduced and thickened portions thereof will contact with the inner face of one end or arm of the clamp to spread the clamp by such turning of the bolt.

To the attainment of the foregoing the invention consists in the improvement hereinafter described and definitely claimed.

In the drawing:

Figure 1 is a plan view of the improvement in applied position.

Figure 2 is a similar view with parts in section and showing the manner in which the bolt expands the clamp.

Figure 3 is a side elevation of the clamp.

Figure 4 is a view looking at right angles to Figure 3.

Figure 5 is a sectional view approximately on the line 5—5 of Figure 1.

Figure 6 is a plan view of the bolt and the head therefor removed from the bolt.

In Figures 1 and 2 we have illustrated our improvement applied to the terminal post of a storage battery but obviously the device is not to be thus restricted in its useful application as the same may be successfully employed in any connection where a clamp is required.

The clamp in the showing of the drawing comprises a ring body 1 which is of metal that is yieldable under pressure. The body of the clamp may be formed of hingedly connected sections. The ends of the split clamp 1 are formed with enlarged extensions 2 and 3, respectively. These enlarged ends are provided with alining openings, the opening through the end 2 being threaded, as at 4. The opening through the end 3 is indicated by the numeral 5 and is not threaded. The diameter of the opening 5 is less than that of the opening 4.

The numeral 6 designates the threaded portion of a bolt. The bolt has a reduced non-threaded shank extension 7 whose outer end is squared, as at 8. The shank 7 is of a size to be freely received through the opening 8 without contacting with the wall thereof and after the shank is passed through the opening there is rigidly fixed on the squared end 8 thereof a head 9. The bolt proper, that is, the threaded portion 6 is screwed in the threaded bore 4, a wrench being applied to the head 9 for this operation. When the bolt is screwed partly home the head 9 will contact with the outer face of the clamp end 3, and during the screwing operation the ends 2 and 3 of the clamp will be forced toward each other, thus compressing the body of the clamp around the terminal post or other object engaged thereby. When the bolt is screwed in a direction reverse to that just described, the bolt will move out of the threaded bore 4 to bring the shoulder 10 between the shank and bolt proper into contact with the inner face of the end 3 of the clamp and the further turning of the bolt in this direction will cause the ends 2 and 3 to be forced away from each other and thereby expand the body of the clamp.

Thus it will be noted that regardless of the adhesion of the clamp to the article engaged thereby the same can be readily removed therefrom and likewise the clamp may be readily and freely moved to tight frictional engagement with the said object. When employed as a battery terminal clamp the brass or like metal terminal 11 for the insulated conductor is engaged between the head 9 of the bolt and the outer face of the end 3 of the clamp as disclosed by Figure 1 of the drawing.

It is believed that the foregoing description when read in connection with the accompanying drawing will fully and clearly set forth the construction and advantages of the improvement to those skilled in the art to which such invention relates so that further detailed description will not be required. Obviously we do not wish to be restricted to the precise details herein set forth and, therefore, hold ourselves entitled to make such changes therefrom as fairly fall within the scope of what we claim.

Having described the invention, we claim:

A split ring metal clamp which is yieldable under pressure, and which has its ends widened and thickened, an adjustable shouldered member received through the said ends of the clamp and said member having a headed end designed to contact with one of the end members of the clamp when the said members are adjusted longitudinally for compressing the body of the clamp and which shoulder, when the member is adjusted in a second direction, is adapted to contact with the inner face of one end of the clamp for spreading the clamp ends away from each other and for expanding the body thereof.

In testimony whereof we affix our signatures.

LEON R. HAND.
LEWIS A. EYSTER.